May 15, 1945. H. W. GILFILLAN 2,375,783
POWER TRANSMISSION
Filed Aug. 14, 1941 2 Sheets-Sheet 1

INVENTOR
Henry W. Gilfillan.
BY
ATTORNEYS.

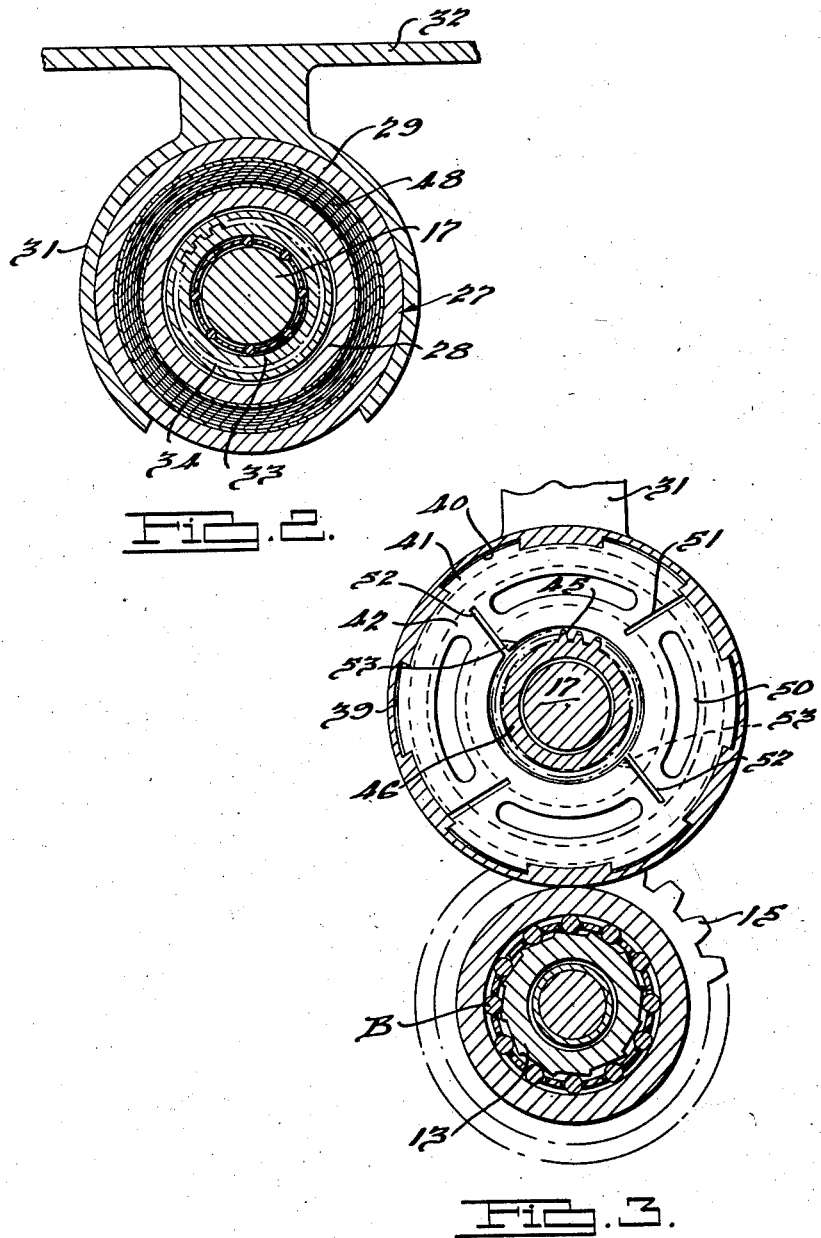

Patented May 15, 1945

2,375,783

UNITED STATES PATENT OFFICE 2,375,783

POWER TRANSMISSION

Henry W. Gilfillan, Detroit, Mich., assignor to Chrysler Corporation, Highland Park, Mich., a corporation of Delaware Application August 14, 1941, Serial No. 406,775

10 Claims. (Cl. 192—84)

This invention relates to motor vehicles and refers more particularly to improvements in power transmission therefor.

It is an object of my invention to provide a simplified change speed mechanism of the type embodying electromagnetic control means.

Another object is to provide an improved electromagnetic clutching structure of the type adapted to control speed ratio changes in vehicle or other drives.

Another object is to provide a transmission clutch control of the electromagnetic type in which the electrical coil is stationarily mounted thereby, among other things, minimizing rotating masses and eliminating the necessity of providing a slip ring.

Further objects and advantages of my invention reside in the novel combination and arrangement of parts more particularly hereinafter described in detail, reference being had to the accompanying drawings in which:

Fig. 2 is a detail sectional elevational view taken according to line 2—2 of Fig. 1.

Fig. 3 is a similar view taken according to line 3—3 of Fig. 1.

Figure 1:
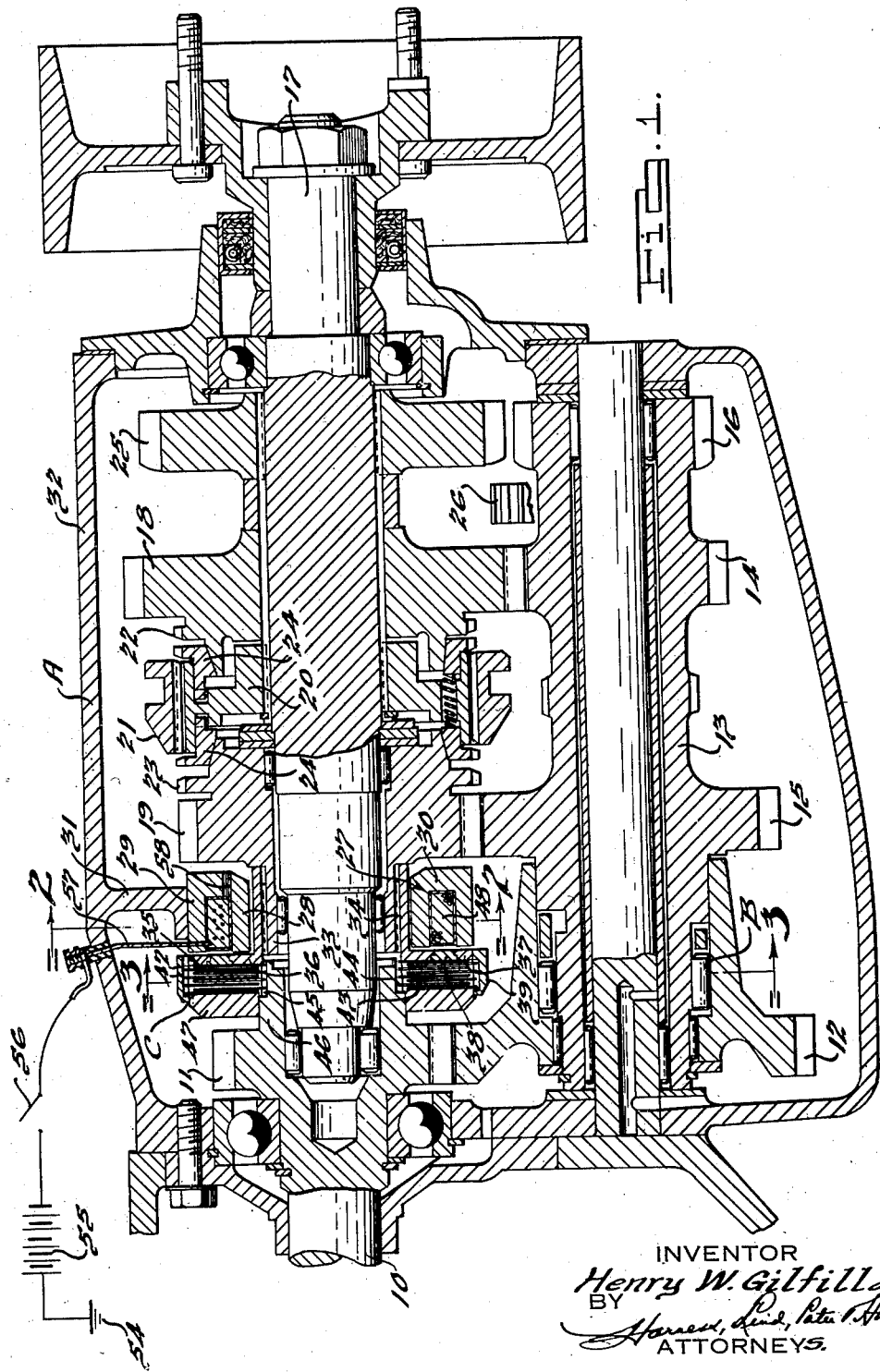
Fig. 1 is a longitudinal sectional elevational view through a typical transmission showing my invention incorporated therewith.

Referring to the drawings, I have illustrated my invention in connection with a transmission wherein one or more pairs of relatively engageable drive control elements are arranged to control a transmission drive, the drive control elements being in the form of a clutch and preferably of the frictionally engageable magnetically controlled type as will presently be more apparent.

Referring to the transmission A of Fig. 1, reference character 10 represents the driving shaft adapted to receive power from the usual vehicle engine, this shaft carrying the main drive pinion 11 which is in constant mesh with gear 12. This gear drives countershaft 13 through an overrunning clutch B of the usual type such that when shaft 10 drives in its usual clockwise direction (looking from front to rear) then clutch B will engage to lock gear 12 to countershaft 13 whenever gear 12 tends to drive faster than the countershaft. However, whenever this gear 12 tends to rotate slower than the countershaft then clutch E will automatically release whereby shaft 10, under certain conditions, may readily drop its speed while countershaft 13 continues to revolve.

Countershaft 13 comprises cluster gears 14, 15 and 16 which respectively provide drives in first, third, and reverse. Freely rotatable on the driven or output shaft 17, which is axially aligned with shaft 10, are the first and third driven gears 18 and 19 respectively in constant mesh with countershaft gears 14 and 15. A hub 20 is splined on shaft 17 and carries therewith a shiftable sleeve 21 adapted for shift in any desired manner, such as manually, from the Fig. 1 neutral position either rearwardly to clutch with teeth 22 or gear 18 or else forwardly to clutch with teeth 23 of gear 19. If desired, toothed blocker synchronizer rings 24 may be located between sleeve 21 and teeth 22, 23 to insure shift of sleeve 21 only when the parts to be clutched are synchronized as is now well known and as set forth, for example, in the co-pending application of O. E. Fishburn, Ser. No. 180,840, filed December 20, 1937, now Patent No. 2,333,165, granted November 2, 1943.

Shaft 17 also carries reverse driven gear 25 fixed thereto. A reverse idler gear 26 is suitably mounted so that when reverse is desired, idler 26 is shifted rearwardly into mesh with gears 16 and 25.

First, third, and reverse speed ratio drives and neutral are preferably under manual shift control of the vehicle driver by manipulation of sleeve 21 or gear 26.

First is obtained by shifting sleeve 21 to clutch with teeth 22, the drive passing from pinion 11 to gear 12 thence through clutch B to countershaft 13. From the countershaft this drive is through gears 14, 18 and sleeve 21, hub 20 to shaft 17.

Third is obtained by shifting sleeve 21 forwardly to clutch with teeth 23, the drive passing from pinion 11 to countershaft 13 as before, thence through gears 15, 19 and sleeve 21 to shaft 17.

Reverse is obtained by shifting idler 26 into mesh with gears 16 and 25, sleeve 21 being in neutral, the reverse drive passing from shaft 10 to the countershaft 13 as before, thence through gears 16, 26 and 25 to shaft 17.

I have provided a novel construction and arrangement of clutching means for operably connecting and disconnecting pinion 11 with gear 19 so as to step-up the speed ratio drive from first to second and from third to fourth which is a direct drive speed ratio. I have provided an electromagnetically controlled clutch C wherein, notwithstanding the rotation of gears 11 and 19, the coil is stationarily mounted thereby dispensing with slip rings and minimizing rotating masses.

The clutch C comprises a flux-conducting coil-receiving annular channeled electromagnet core 27 having inner annulus portion 28 and outer annulus portion 29 connected rearwardly at 30. The magnet core 27 is stationarily mounted in a bracket 31 which depends from the transmission main case 32 so as to position the magnet between gears 11 and 19. This case is preferably of aluminum or other non-magnetic material. The gear 19 has a hub 33 which projects forwardly within annulus 28 and which is splined for drivingly connecting thereto the rearwardly extending hub 34 of a driven clutch plate 35, the hub 34 also lying within annulus 28 and rotating freely therewithin. The plate 35 comprises inner and outer magnetic annular portions 36, 37 separated by non-magnetic annulus 38. Welded to the outer annulus 37 is a forwardly projecting annular flange 39 of non-magnetic or low permeability material, this case being provided with internal splines 40 for receiving the tongues 41 (Fig. 3) of the thin flux-conducting friction driven elements or disks 42. Between adjacent disks 42 there is a generally similar driving element or disk 43, these disks terminating outwardly short of the flange 39 and having inner tongues 44 for engagement with splines 45 of the rear extension 46 of pinion 11.

A magnetic pressure plate 47 is seated on extension 46 for movement toward plate 35, the disks 42, 43 being disposed in closely associated relationship between plates 47 and 35. For minimized flux leakage, the part 46 and gear 11 when formed integral therewith may be made of stainless steel. A flux-forming coil 48 is disposed between annuli 28 and 29 such that when the coil is electrically energized the plate 47 and disks 42, 43 are drawn toward plate 35 serving frictionally to pack the disks together and thereby drivingly connect pinion 11 with gear 19. The electromagnetic clutch C is therefore controlled by energization of coil 48 which causes a magnetic flux circuit to be formed in a path around the coil, viz., annulus 29 through annulus 37 and discs 42, 43 to plate 47 thence back through the discs and annuli 36, 28 to portion 30 and back to annulus 29. The air gap between plate 35 and annuli 28, 29 is maintained relatively small.

A small portion of the flux in the aforesaid magnetic circuit is shunted at each disc 42, 43 but this is utilized to draw the disks tightly together. To insure most of the magnet flux following the complete circuit, each disk 42, 43 is formed with a plurality of axial slots 50 therethrough, these slots being registered with each other so that most of the flux is prevented from shunting through the disks and is made to travel through the prescribed circuit including plate 47. In order to prevent warping of the disks and to impart added flexibility thereto they may also be slotted at 51, 52 thus facilitating a tight packing of the disks under action of the magnetic flux generated at coil 48. Furthermore, to facilitate slight separation of disks 42, 42 when coil 48 is de-energized thereby minimizing friction loss, heat generation, and oil drag from the lubricant in the transmission, portions of the disks may be deflected so as to bias them into relative disengagement without interfering with their tightly packed relationship when coil 48 is energized. To this end, alternate disks such as the disks 42 may have terminal portions adjacent slots 52 slightly deflected out of their general radial planes as at 53. One portion is deflected axially in a direction opposite to that of the other with the result that the disks 42, 43 are biased into slight separation from each other when clutch C is released.

In order to energize the coil 48 it is not necessary to provide any collector ring. In Fig. 1 I have shown in diagrammatic form an electrical circuit comprising ground 54, battery 55, switch 56 and lead 57 to coil 48 which is grounded at 58 at the part 30 and case 32. Any desired control system may be employed for energizing coil 48 such as shown for example in the copending application of C. A. Neracher et al., Ser. No. 373,756, filed January 9, 1941. For simplicity of illustration I have shown switch 56 as controlling the electrical circuit.

When driving in first, second is obtained by energizing coil 48 to engage clutch C. The drive then passes from pinion 11 through clutch C to gears 19 and 15 thence through countershaft 13 and gears 14 and 18 to sleeve 21 and shaft 17. By preference the switch 56 is closed with accompanying release of the usual engine throttle-controlling accelerator pedal so that the clutch C is not called upon to slow the engine down against its driving action. However, by proper proportioning of the strength of the magnetic flux and other parts the capacity of clutch C may readily be made to step-up the drive from first to second and from third to fourth during drive.

When driving in second, the clutch B overruns. By similar operation, the drive may be stepped-up from third to direct by energizing coil 48 accompanied by overrun at clutch B. The direct drive passes from pinion 11 through clutch C to gear 19 thence to sleeve 21 and shaft 17.

When driving in second or direct, clutch C being engaged, the drive may be instantly stepped-down by breaking the circuit to coil 48 whereupon the engine will speed up to engage clutch B to effect first or third depending on the previous setting of sleeve 21.

I claim:

1. In a power transmission; coaxially disposed torque transmitting elements adapted to be clutched together; an electromagnet core stationarily mounted between said elements; an annular shaped channel in a lateral face portion of said core forming radially spaced apart annuli; a flux-generating coil disposed in the channel of said core; a plate laterally disposed adjacent said core and having a hub portion extending within said core normal to the lateral face thereof; a hub carried by one of said elements and projecting within said core for driving connection with said plate hub; a second plate movable toward the first said plate; a plurality of sets of disks between said plates and respectively drivingly connected to said elements, said disks adapted to be packed together by said movement of said second plate; said plates and disks having portions therefore in alignment with said annuli and said plates cooperating with said core to provide a double path through said disks for the flux generated by said coil.

2. In a power transmission; a relatively stationarily mounted gear case; coaxially disposed torque-transmitting elements adapted to be clutched together within said case; a bracket carried by said case and projecting therewithin, said bracket having a wall portion surrounding one of said elements and spaced radially therefrom; an annular channeled core supported by said bracket wall portion, said core comprising a pair of annuli disposed in relatively radially spaced concentric relationship co-axial with said elements and magnetically connected together at one of their ends and having their other ends magnetically separated from each other; a rotatable pole plate of magnetizable material laterally spaced from said core on the axis of said elements and normally freely shiftable relative to said core and elements a plurality of sets of clutch disks of magnetizable material respectively drivingly connected to said torque-transmitting elements and disposed adjacent said magnetically separated ends of said annuli between said ends and said pole plate, said disks having portions thereof in line with said annuli; and a relatively stationary flux-generating coil disposed in said space between said annuli and adapted upon energization to form a magnetic circuit in said core, plate, and disks whose lines pass in two directions through said disks.

3. In a power transmission, a pair of torque transmitting elements, an electro-magnet core stationarily mounted with respect to said elements and coaxial therewith, said core having radially spaced apart annular magnetizable portions, a core-energizing winding disposed in the space between said annular portions of said core, a pole plate of magnetizable material laterally spaced from said core and normally freely shiftable axially of said core and elements, said plate having radial portions in face to face relation with said radially spaced annular portions respectively of said core whereby upon energization of said coil a magnetic circuit will be produced having one leg thereof passing from one of said annular portions to said plate and another from said plate to the other of said annular portions of said core, and a plurality of friction members axially intermediate said core and plate and shiftable relative thereto, said members being laterally spaced from said core and positioned to extend across both legs of said magnetic circuit when said coil is energized, certain of said members being drivingly connected with one of said elements and others with the other of said pair of elements.

4. In a power transmission, a pair of torque transmitting elements, an electro-magnet core stationarily mounted with respect to said elements and coaxial therewith, said core having radially spaced apart annular portions, a core-energizing winding disposed in the space between said annular portions of said core, an axially shiftable pole plate of magnetizable material laterally spaced from said core and having radial portions in face to face relation with said radially spaced annular portions respectively of said core, whereby upon energization of said winding a magnetic circuit will be produced having one leg thereof passing from one of said annular portions to said plate and another from said plate to the other of said annular portions of said core, a plurality of axially shiftable friction members between said plate and core and having radial portions in face to face relation with said radially spaced annular portions respectively of said core, whereby said members extend across both legs of said magnetic circuit when said coil is energized, certain of said members being drivingly connected with one of said elements and others with the other of said pair of elements, and rotatable means between said core and members for spacing said members from said core.

5. In a power transmission, a pair of torque transmitting elements, an electro-magnet core stationarily mounted with respect to said elements and coaxial therewith, an annular-shaped channel in a lateral face portion of said core forming radially spaced apart annular portions thereon, a core energizing winding disposed in said channel, a rotatable pole plate of magnetizable material, a second pole plate between said first mentioned pole plate and said core and spaced from said core, said pole plates being shiftable axially relative to each other and said second pole plate having radially spaced apart annular portions of magnetizable material in face to face relation respectively with said spaced annular portions in the lateral face of said core, and a plurality of friction members between said plates and shiftable axially relative thereto, certain of said members being drivingly connected with one of said elements and others with the said other of said pair of elements.

6. In a power transmission, a pair of torque transmitting elements, an electro-magnet core stationarily mounted with respect to said elements and coaxial therewith, an annular-shaped channel in a lateral face portion of said core forming radially spaced apart annular portions thereon, a core-energizing winding mounted in said channel, a pole plate associated with one of said elements, said plate having radially spaced apart annular portions of magnetizable material connected by non-magnetic material and in face to face relation respectively with said radially spaced portions in the lateral face of said core and spaced therefrom, a second pole plate of magnetizable material substantially paralleling said first mentioned plate and shiftable axially relative thereto, and a plurality of friction members between said plates and shiftable axially relative thereto, certain of said members being drivingly connected with one of said elements and others with the said other of said pair of elements, and certain of said members having radially spaced apart portions whereby upon energization of said winding said core, plates, and members, form a magnetic circuit whose lines of force pass in two directions through said members.

7. In a power transmission, a pair of torque transmitting elements, an electro-magnet core stationarily mounted with respect to said elements and coaxial therewith, an annular-shaped channel in a lateral face portion of said core forming radially spaced apart annular portions thereon, a core energizing winding mounted in said channel, a pole plate rotatably associated with one of said elements, said plate having radially spaced apart annular portions of magnetizable material in face to face relation respectively with said radially spaced portions in the lateral face of said core and spaced therefrom, a second pole plate of magnetizable material substantially paralleling said first mentioned plate and shiftable axially relative thereto, and a plurality of friction members between said plates and shiftable axially relative thereto, certain of said members being drivingly connected with the pole plate associated with the said one of said elements and others with the said other of said pair of elements, and certain of said members having radially spaced apart portions of flux conducting material whereby upon energization of said winding said core, plates, and members, form a magnetic circuit whose lines of force pass in two directions through said members.

8. In a power transmission, a pair of torque transmitting elements, an electro-magnet core stationarily mounted with respect to said elements and coaxial therewith, a core energizing winding mounted on said core, a rotatable axially movable pole plate of magnetizable material, a second rotatable plate between said pole plate and said core and axially spaced at a fixed distance from said core, said first mentioned plate being shiftable axially relative to said second plate, engageable juxtaposed flexible friction members between said plates one drivingly connected to one of said pair of torque transmitting elements and another drivingly connected to the other of said pair of torque transmitting elements, said members being shiftable axially into compact relationship with said plates in response to movement of said shiftable plate incident to energization of said winding whereby to establish a drive between said pair of elements, and certain of said members having portions thereof deflected out of the normal plane of said members for normally spacing adjacent members from each other.

9. In a power transmission; a relatively stationarily mounted gear case; coaxially disposed torque transmitting elements adapted to be connected in drive within said case; a member carried by said case and including an annular portion of magnetizable material substantially coaxial with and radially spaced from one of said elements, said portion having an annular channel therein defining a pair of annuli disposed in radially spaced relationship, magnetically connected at the base of the channel and magnetically separated at the mouth of the channel, a pole plate of magnetizable material laterally spaced from said annuli on the axis of said elements and normally freely shiftable axially relative to said annuli and elements, a plurality of sets of clutch discs of magnetizable material for establishing a torque transmitting relationship between said elements upon magnetization of said annuli, said discs being disposed adjacent the ends of said magnetically separated annuli and between said ends and said pole plate, and said discs having portions thereof in line with said annuli, and a relatively stationary flux generating coil disposed in said channel and adapted upon energization thereof to establish a magnetic circuit in said annuli, plate, and discs whose lines pass in two directions through said discs.

10. In a power transmission a pair of coaxial torque transmitting elements, an electromagnet core stationarily mounted with respect to said elements and surrounding the axis thereof, an annular-shaped channel in a lateral face portion of said core forming radially spaced apart annular portions thereon, a core energizing winding disposed in said channel, a pair of pole plates comprising magnetizable material laterally spaced relative to each other, one of said pole plates being laterally spaced at a fixed distance from said core face and the other being axially shiftable toward said core face upon energization of said winding, a plurality of axially shiftable juxtaposed friction members between said plates, one drivingly connected to one of said pair of torque transmitting elements and another drivingly connected to the other of said pair of torque transmitting elements, said members being adapted to be compacted by said shiftable pole plate to establish a torque transmitting relationship between said elements, said members having spaced radial portions of magnetizable material aligned with said radially spaced annular portions respectively of said core whereby upon energization of said winding said core, plates and members form a magnetic circuit whose lines of force pass in two directions through said members.

HENRY W. GILFILLAN.